US007127512B2

(12) United States Patent
Minear et al.

(10) Patent No.: US 7,127,512 B2
(45) Date of Patent: Oct. 24, 2006

(54) METHOD AND APPARATUS FOR TWO-PHASE COMMIT IN DATA DISTRIBUTION TO A WEB FARM

(75) Inventors: Brian Minear, San Diego, CA (US); Phil Nguyen, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 838 days.

(21) Appl. No.: 10/079,772

(22) Filed: Feb. 19, 2002

(65) Prior Publication Data

US 2003/0158955 A1 Aug. 21, 2003

(51) Int. Cl.
*G06F 15/173* (2006.01)
*G06F 17/30* (2006.01)
(52) U.S. Cl. .................... 709/226; 707/201
(58) Field of Classification Search .......... 709/203, 709/226, 221, 225, 229; 707/201–204; 714/1, 714/2
See application file for complete search history.

(56) References Cited

U.S. PATENT DOCUMENTS

| 6,137,862 | A | 10/2000 | Atkinson et al. ........... 379/34 |
| 6,188,695 | B1 * | 2/2001 | Przybysz .................. 370/410 |
| 6,243,715 | B1 * | 6/2001 | Bogantz et al. ............ 707/201 |
| 6,269,080 | B1 | 7/2001 | Kumar ..................... 370/236 |
| 6,785,678 | B1 * | 8/2004 | Price ....................... 709/226 |

* cited by examiner

*Primary Examiner*—Saleh Najjar
*Assistant Examiner*—David Lazaro
(74) *Attorney, Agent, or Firm*—Philip R. Wadsworth; Robert J. O'Connell

(57) ABSTRACT

Various methods and apparatus for synchronizing data between members of a web farm are disclosed. The web farm may include a primary member and at least one backup member. The web farm members may include modules for determining whether new data is available to the web farm; placing the web farm in a prepare state if new data is available; placing the web farm in a commit state if members of the web farm successfully receive the new data; and placing the web farm in an abort state if any of the members of the web farm do not successfully receive the new data.

28 Claims, 8 Drawing Sheets

METHOD AND APPARATUS FOR TWO-PHASE COMMIT IN DATA DISTRIBUTION TO A WEB FARM

BACKGROUND

I. Field

This disclosure relates to data communication, and in particular, to a novel and improved web farm data synchronization system.

II. Background

Web farms are integral to high-volume web sites because they increase the availability of web sites by distributing processing tasks among several web farm "members."

FIG. 1 is a schematic diagram of a prior art web farm 100 including members 1 . . . n. Each member is configured to function as a web server as is known in the art and may include a processor 102 and a database 104 for the storage and retrieval of data.

One challenge in implementing a web farm is ensuring that data files are synchronized among all members of the web farm. Typically, new data is presented simultaneously to all members of the web farm 100 through a gateway 106. For the web site to function effectively, data that is presented to the web farm must be stored within the individual members such that data integrity is maintained from member to member. For example, if the new data presented to the web farm represents a new customer to be stored in customer database, all members of the web farm must store the new customer data prior to a new transaction occurring. If any member of the web farm fails to store the new data, the integrity of any future transactions may be compromised.

The prior art has recognized the importance of data synchronization and made attempts to ensure the integrity of distributed data. For example, prior art web farms may employ a time delay to allow all members of the web farm to catch up and store the new data. However, this approach has certain disadvantages. Such a time delay necessarily imposes a limitation on the availability of the individual members of the web farm, and thus the availability of the hosted web site as whole. Furthermore, during the time delay, the new data is being stored on some members of the web farm, while the other members are catching up. Thus, the web farm is not synchronized during the time period. Should at least one of the members fail to synchronize the new data, the web farm may need to be rolled back, a process whereby the data is restored on the members to a previous known state. Rolling back a web farm is an undesirable procedure that is tedious and potentially error-prone.

SUMMARY

Methods and apparatus for synchronizing data between members of a web farm are disclosed. In one embodiment, a method includes determining whether new data is available to the web farm; placing the web farm in a prepare state if new data is available; placing the web farm in a commit state if members of the web farm successfully receive the new data; and placing the web farm in an abort state if any of the members of the web farm do not successfully receive the new data.

In a further aspect, a method for synchronizing data between members of a web farm is disclosed including instructing the members of the web farm to receive new data; determining whether any of the web farm members failed to receive the new data; instructing the web farm members to store the new data if all of the web farm members received the new data; and instructing the web farm members to revert to a previous set of data if any of the web farm members failed to receive the new data.

A synchronized web farm is also disclosed. In one aspect, the web farm may include a primary web farm member configured to receive data from an application download server; and at least one backup web farm member also configured to receive data from an application download server. The primary member may be configured to determine whether new data is available to the web farm; place the web farm in a prepare state if new data is available; place the web farm in a commit state if members of the web farm successfully receive the new data; and place the web farm in an abort state if any of the members of the web farm do not successfully receive the new data.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine readable data structures. Furthermore, it is contemplated that data structures embodying the present invention will be transmitted across computer and machine-readable media, and through communications systems by use of standard protocols known in the art.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

Exemplary embodiments of disclosed apparatus and methods may be disclosed herein. The word "exemplary" is used exclusively herein to mean "serving as an example, instance, or illustration." Any embodiment described as an "exemplary embodiment" is not to be construed as necessarily preferred or advantageous over other embodiments described herein.

Exemplary Structure

Figure 1:
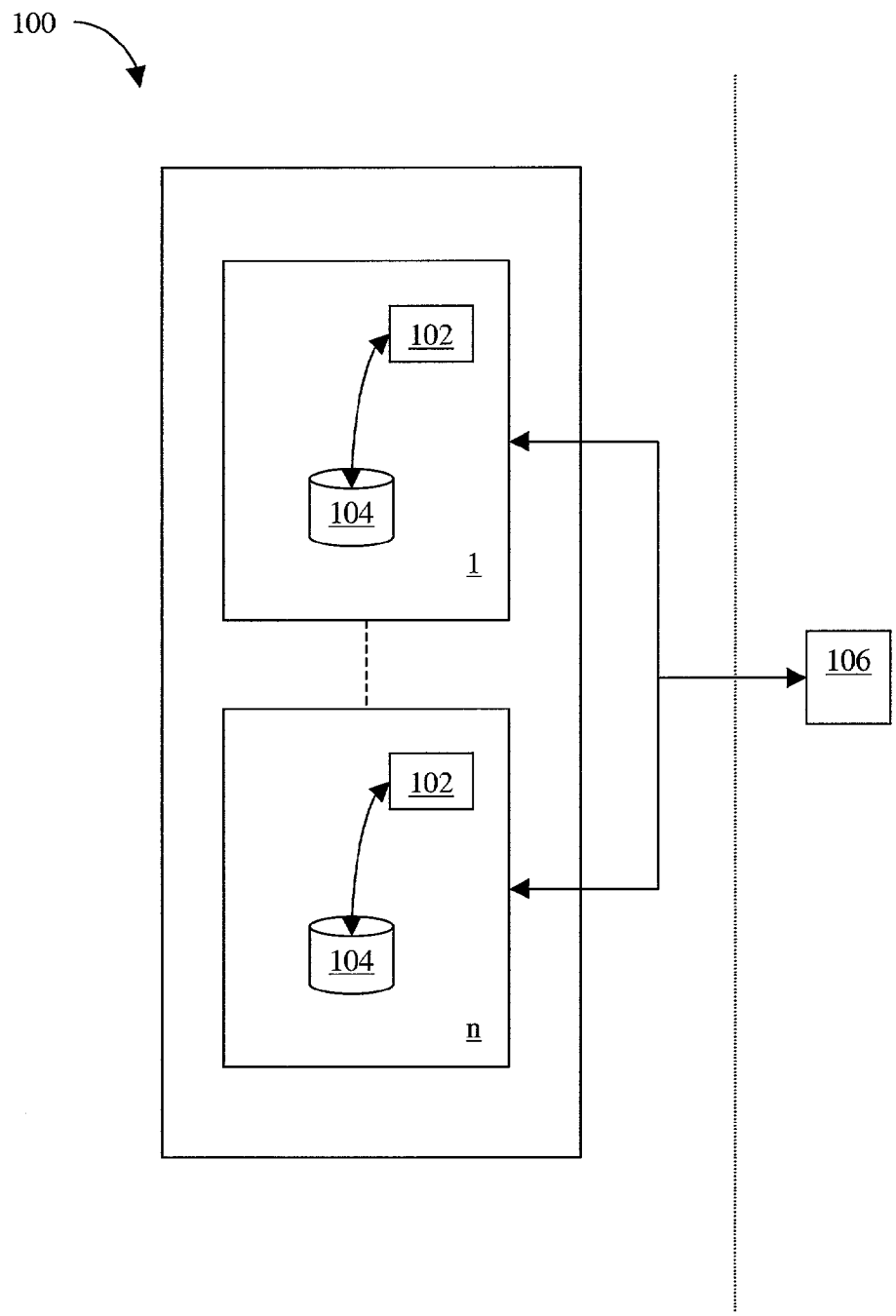
FIG. 1 is a schematic diagram of a prior art web farm.
Figure 2:
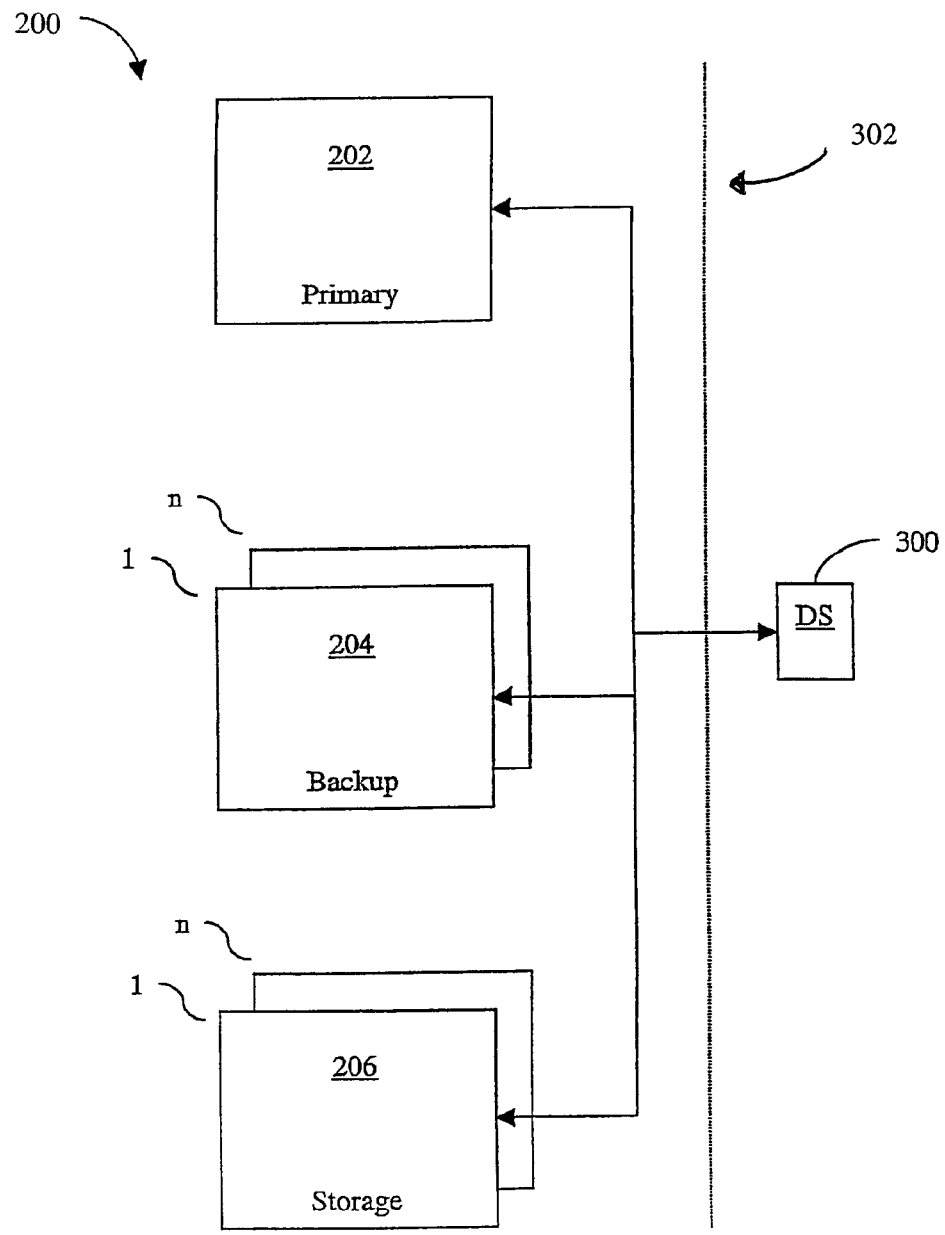
FIG. 2 is a schematic diagram of one aspect of a web farm configured in accordance with the teachings of this disclosure.

FIG. 2 is a schematic diagram of a web farm 200 configured in accordance with the teachings of this disclosure. The web farm 200 may include a primary member 202 and at least one backup member 204, each configured as will be described in more detail below. The web farm may also include at least one storage member 206.

It is contemplated that the various members of the web farm may include hardware and software known in the art for running an operating system such as Microsoft Windows®, UNIX, LINUX, or any other desired operating system, and are preferably configured to run applications written in the Java language. A member machine may comprise may comprise a stand-alone computer, a multi-CPU machine, or a rack-mounted server housed together with other servers on a rack.

The members of the web farm 200 may also be configured to administrate a database such as Oracle® using hardware and software as is known in the art. In a exemplary embodiment, the members of the web farm 200 may be configured to store and retrieve data received in the Extended Markup Language (XML) format.

The members of the web farm 200 are preferably configured to receive data from a Distribution Server 300. The DS 300 may be configured to function as a transaction gateway between the web farm 200 and the internal network of the enterprise hosting the web farm. To provide secure transaction capability, the web farm 200 and the DS 300 may communicate through a firewall 302 using secure protocols known in the art, such as SSL over VPN.

Each member of the web farm 200 will now be disclosed in more detail.

Primary Member

In the web farm 200 of the present disclosure, it is contemplated that there will be one primary member 202 that is responsible for the synchronization of the various members of the web farm. As every farm member in the web farm should represent the data state, the primary member 202 functions as a distribution manager and ensures that all members of the web farm have the data set. In an exemplary embodiment, the primary member 202 ensures that all members have the same XML and application package files at any given time.

Figure 3:
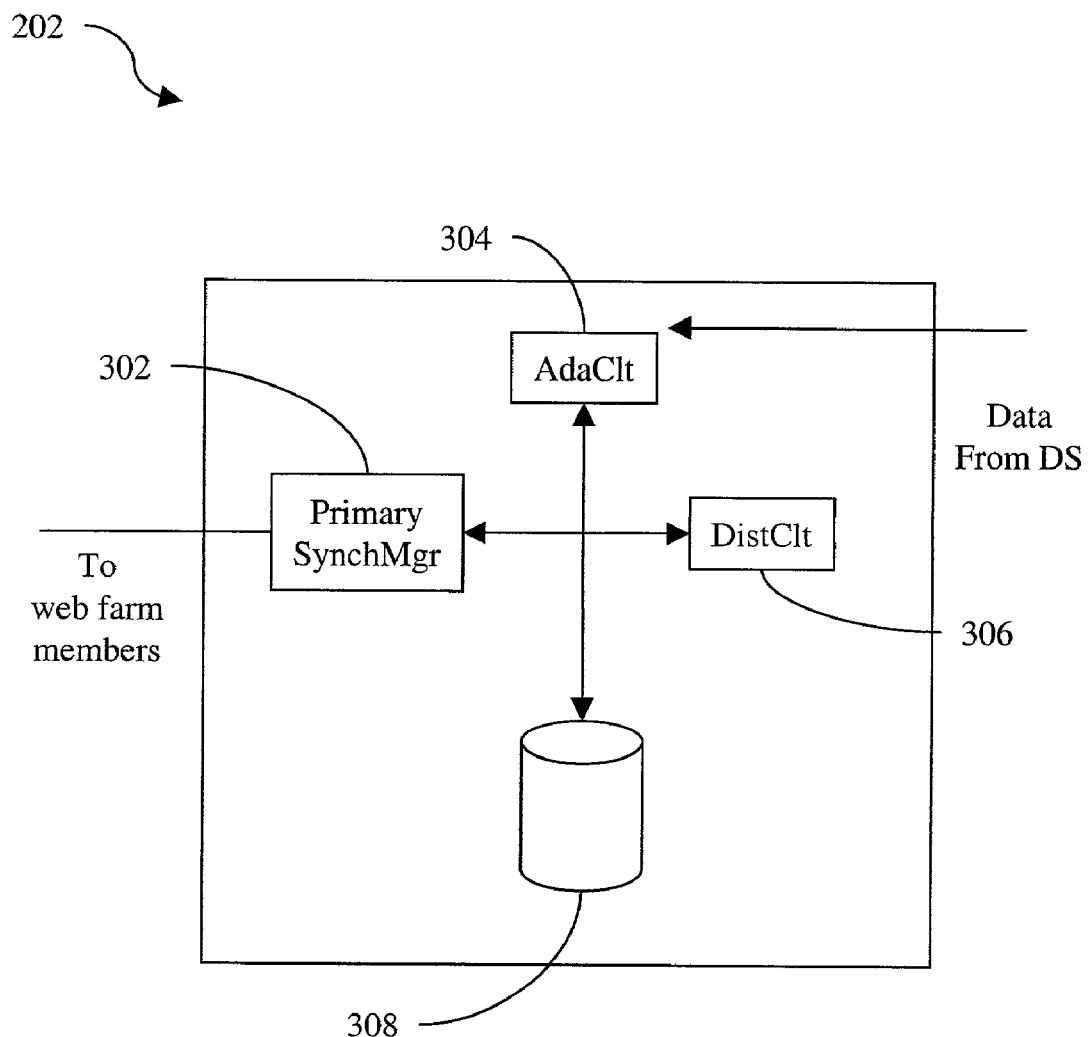
FIG. 3 is a schematic diagram of one aspect of a primary member configured in accordance with the teachings of this disclosure.

FIG. 3 shows a functional block diagram of a primary member 202 configured in accordance with the teachings of this disclosure. The primary member 202 includes a primary synchronization manager (SyncMgr) module 302 for controlling the scheduling and the synchronization of all data, such as XML and package files, in each web farm member. The SyncMgr module 302 may be programmed as a Java application. The SyncMgr module may run on each of the web farm machines using separate Java Virtual Machines for reliability. The primary SyncMgr 302 may also be operatively coupled to other members of the web farm 200 to provide primary synchronization control as will be described in more detail below.

The primary manager 202 may also include an Application Download Client (AdaClt) module 304 for downloading data from the DS 300 of FIG. 2. The AdaClt module 304 preferably communicates with the DS 300 through the firewall 302 via HTTPS to receive data, such as XML and package files. The AdaClt module 304 may be programmed as a Java application.

The primary manager 202 may also include a Distribution Client (DistClt) servlet 306 for interfacing with the AdaClt module 304. The DistClt servlet 306 may used by the web farm members to activate the AdaClt 304 to initiate the download process and download data to a database 308. The DistClt servlet 306 may comprise a Java servlet engine configured to start up at boot time.

Figure 4:
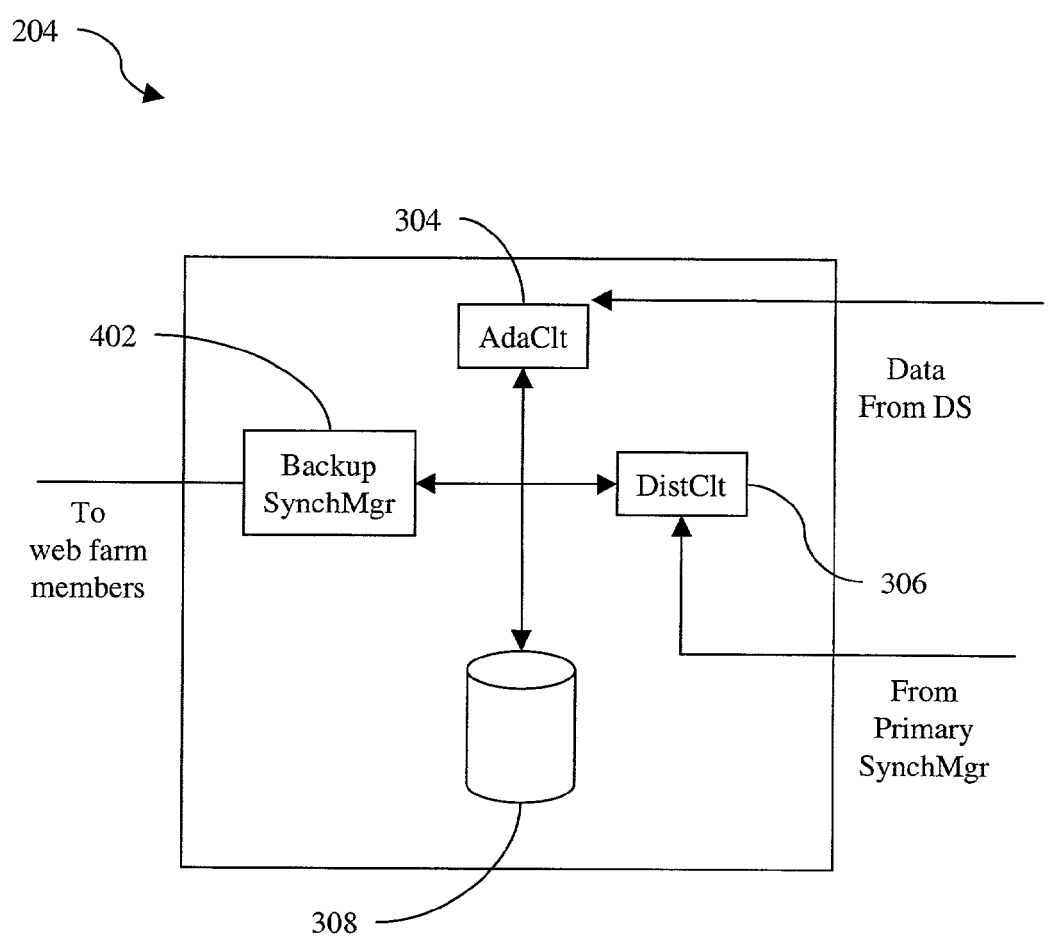
FIG. 4 is a schematic diagram of one aspect of a backup member configured in accordance with the teachings of this disclosure.

FIG. 4 shows a functional block diagram of a backup member 204 configured in accordance with the teachings of this disclosure. The backup member 204 also includes a SyncMgr module 402 as described above. However, the backup SyncMgr 402 is preferably operatively coupled to other members of the web farm 200 to provide backup synchronization control as will be described in more detail below.

The backup member 204 may also include an AdaClt module 304 and a DistClt servlet 306 as described above for receiving data from the DS 300. The backup module 204 also includes a database 308 for the storage and retrieval of data received from the DS 300, and is preferably configured to store data received from the DS 300 under the control of the primary member 202.

Figure 5:
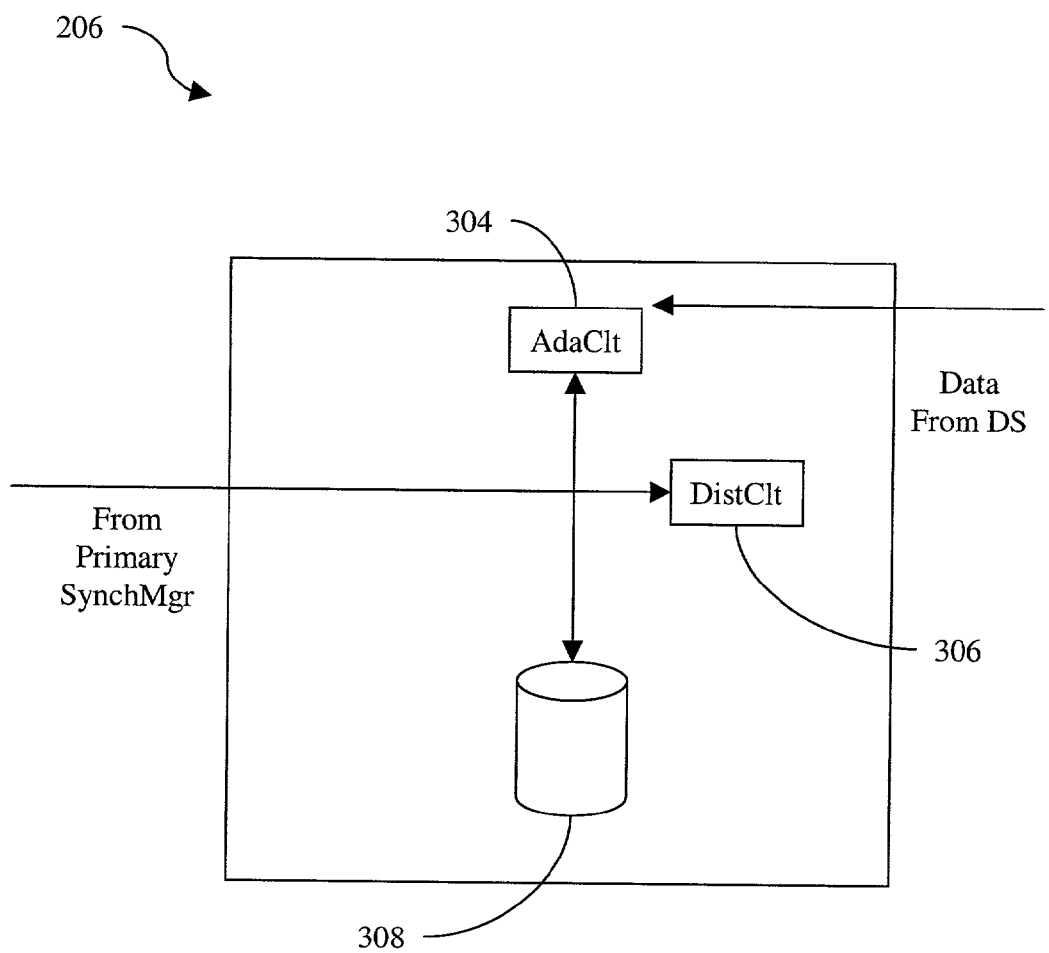
FIG. 5 is a schematic diagram of one aspect of a storage member configured in accordance with the teachings of this disclosure.

FIG. 5 shows a functional block diagram of a storage member 206 configured in accordance with the teachings of this disclosure. The storage member 206 is preferably configured to store data received from the DS 300 under the control of the primary member 202.

The storage member 206 may include an AdaClt module 304, a DistClt servlet 306, and a database 308 as described above.

Various aspects of operation for a web farm of this disclosure will now be disclosed.

Operation

The SyncMgr module is configured to implement a two-phase commit algorithm to ensure members of the web farm receive new data from the distribution center at the same time.

Figure 6:
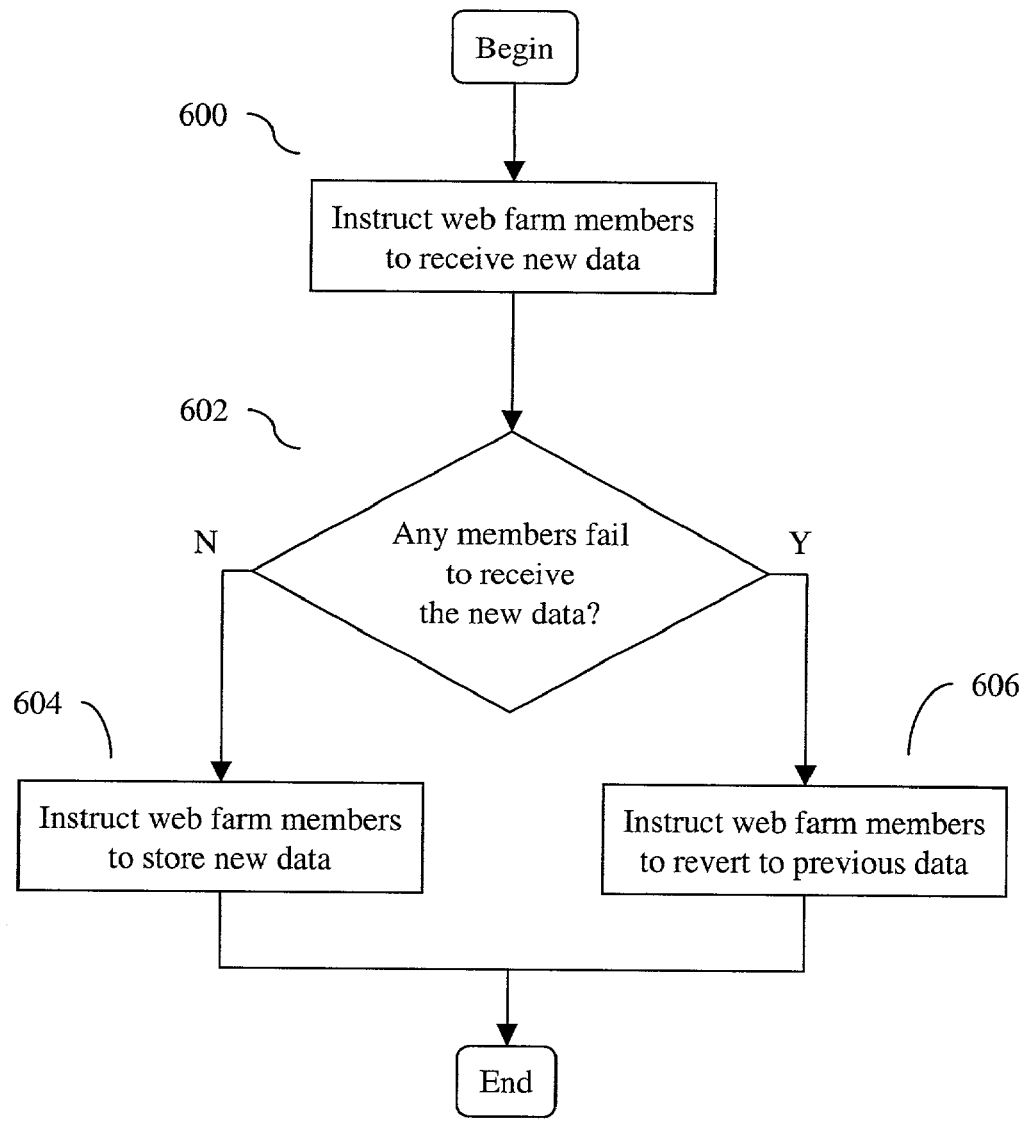
FIG. 6 is a flow diagram of one aspect of a web farm synchronization in accordance with the teachings of this disclosure.

FIG. 6 is a flowchart of one aspect of data synchronization in accordance with the teachings of this disclosure. The process of FIG. 6 begins in act 600, where the members of the web farm are instructed to get new data. In one aspect of this disclosure, this act may be accomplished by a primary member instructing the other members of the web farm to fetch data from an distribution server.

The process continues in query 602, where it is determined whether any web farm members failed in their attempt to receive the new data. If none of the web farm members failed to receive the new data, the web farm members may be instructed to store the new data in act 604.

However, if any of the web farm members failed to properly receive the new data, all members of the web farm may be instructed to revert back to the previous data set in act 606. Thus, if any member of the web farm is unable to properly receive the new data, all web farm members may revert back to the existing data set.

Hence, the process of FIG. 6 ensures that either all of the web farm members receive the new data, or, if any one of the web farm members fails to receive the new data, none of the web farm members use the new data. Thus, the process of FIG. 6 may eliminate any data inconsistencies between web farm members.

Figure 7:
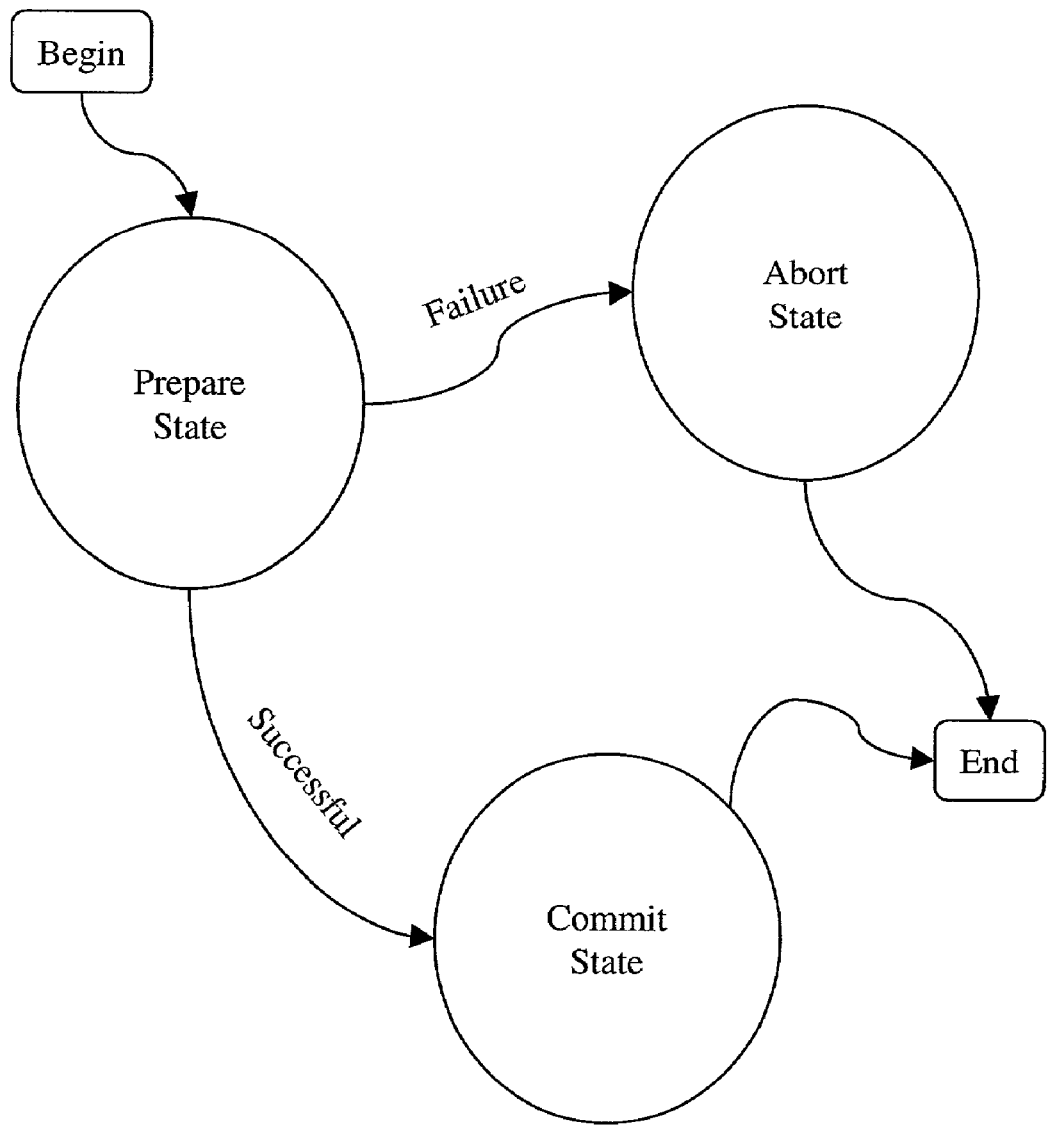
FIG. 7 is a state diagram of one aspect of a web farm synchronization in accordance with the teachings of this disclosure.

FIG. 7 is a state diagram of a further aspect of data synchronization in accordance with the present disclosure. The process of FIG. 7 begins when the web farm is placed in a prepare state. In one aspect, the primary member as disclosed above may function as a distribution manager by requesting each web farm member to download or receive data from a distribution center. It is contemplated that the distribution manager may periodically check for new data. When new data is available, the distribution manager may then place the web farm in a prepare state.

During the prepare state, it is contemplated that each web farm member may store newly received data in a temporary repository, such as a new database file.

While still in the prepare state, each web farm member may notify the distribution manager of the storage state of the new data, i.e., whether their respective receive process was successful or not. It is contemplated that the distribution manager may wait a predetermined time for all web farm members to respond during the prepare state.

If all web farm members respond with an indication that new data has been successfully stored, the web farm may then move to a commit state. In the commit state, the distribution manager may request the web farm members to make the new data their permanent data. This may be accomplished by the distribution manager requesting that newly-stored data in a temporary repository be made the current data.

If any of the web farm members indicate that the new data was not stored successfully, the web farm may be placed in an abort state. In the abort state, the distribution manager may implement a rollback action in which the prepare state is aborted and the temporary data is not made the current data. Additionally, if any of the web farm members fail to respond in a predetermined amount of time, the distribution manager may determine that the prepare state has timed out, and place the web farm in the abort state.

Figure 8:
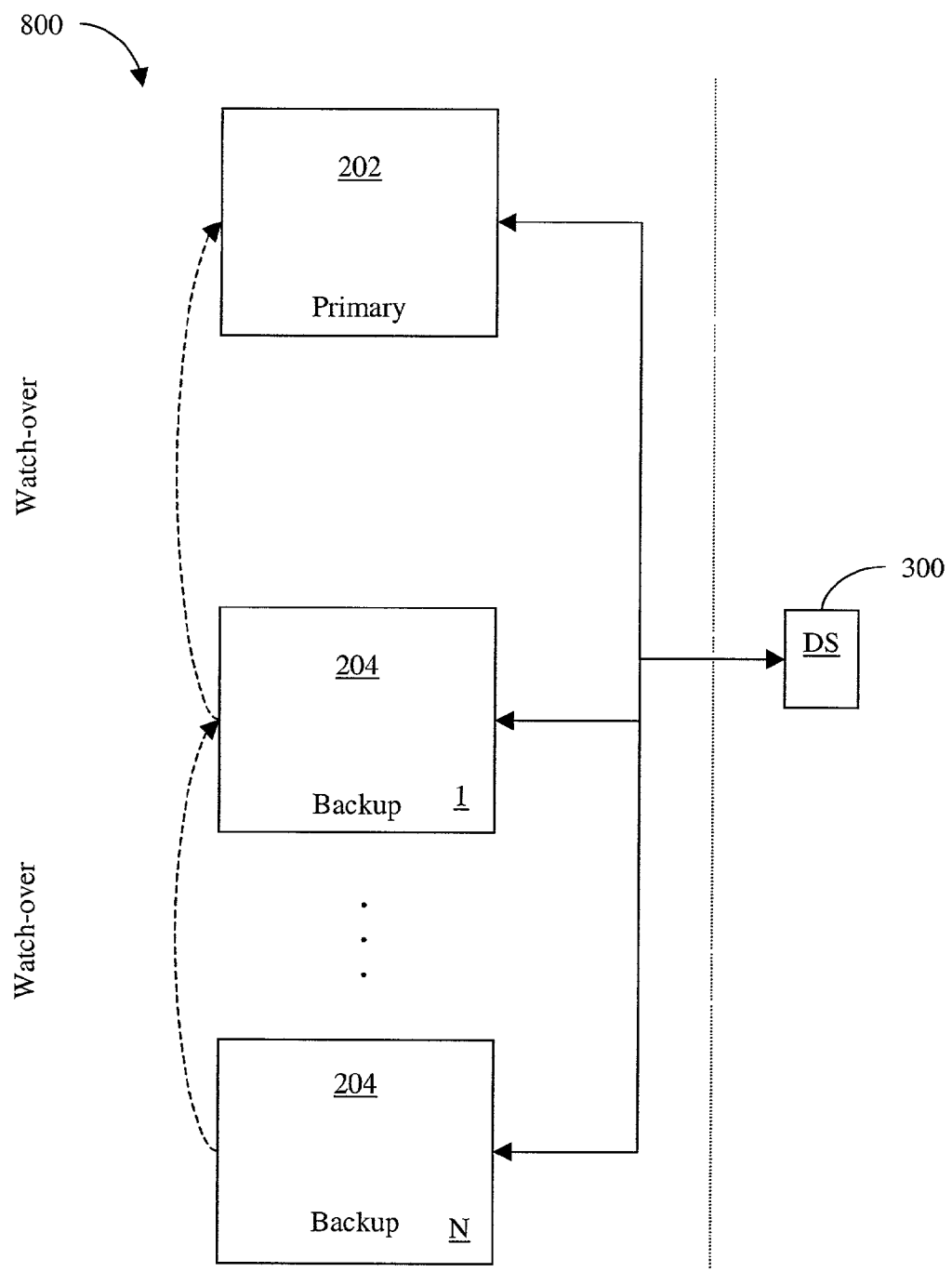
FIG. 8 is a schematic diagram of one aspect of a web farm featuring fail-over support in accordance with the teachings of this disclosure.

The web farm of the present disclosure may also provide fail-over support in case the primary member fails. FIG. 8 is a block diagram of a web farm 800 configured to provide fail-over support in accordance with the teachings of this disclosure. FIG. 8 includes a primary member 202 and one or more backup members 204, each configured substantially as shown and described above.

FIG. 8 further shows that the SyncMgrs of the primary and backup members may be operatively coupled to provide fail-over support. As disclosed above, there is only one primary SyncMgr 202 in the web farm, but there may be one or more backup SyncMgrs 204. The identity of the primary SyncMgr may be predetermined through methods such as hardwiring or preprogramming, thereby ensuring that a primary web farm member exists at start-up.

One of the backup members 204 may be configured to watch over the primary member 202. In an exemplary embodiment, the SyncMgr module of the backup member 204 may periodically check to ensure the primary manager 202 is available. If the backup member 204 determines that the primary member 202 is not available, the backup manager 204 may conclude that the primary manager 202 has failed. In a further exemplary embodiment, a backup manager may make a predetermined number of consecutive unsuccessful attempts before concluding that the primary manager has failed.

In the event of the failure of the primary member, a backup manager may assume control of the web farm by becoming the primary member.

FIG. 8 further shows that in the case where there is a plurality of backup members, the backup members may be configured to watch over each other in a chain of N members, where N is the number of backup members present in the web farm. In the event of multiple failures, the next backup member in line will assume the role of the primary member. Thus, the web farm of the present disclosure provides N+1 levels of redundancy, including the initial primary manager.

In an exemplary embodiment, the order of the hostnames recorded in a configuration file may determine which backup SyncMgr will take over the primary duty.

Additionally, various site-specific information may be contained in configuration files for use by the modules of the disclosed web farm.

The previous description of various embodiments, which include preferred embodiments, is provided to enable any person skilled in the art to make or use the embodiment of the present disclosure. The various modifications to these embodiments will be readily apparent to those skilled in the art, and the generic principles defined herein may be applied to other embodiments without the use of the inventive faculty. Thus, the present disclosure is not intended to be limited to the embodiments shown herein but is to be accorded the widest scope consistent with the principles and novel features disclosed herein.

What is claimed is:

1. A method for synchronizing data between members of a web farm, the web farm comprising a primary member, at least one backup member, and a distribution server, the method comprising:

determining, at the primary member, whether a new data is available to the web farm at said distribution server;

if the new data is available, at said primary member, placing the web farm in a prepare state, wherein when said web farm is in said prepared state said primary member causes the primary member and each backup member to:

retrieve the new data from the distribution server and store said retrieved new data in a temporary storage;

upon successfully storing said retrieved new data in said temporary storage, notify said primary member;

at the primary member, if notified by said primary member and each backup member within a predetermined time since the start of said prepare state, placing the web farm in a commit state, wherein when said web farm is in said commit state, said primary member causes the primary member and each backup member to commit said retrieved new data; and at the primary member, if not notified by one or more of said primary member and each said backup member within said predetermined time from the start of said prepare state, placing the web farm in an abort state, wherein when said web farm is in said abort state, said primary member causes the primary member and each backup member to roll back said new data.

2. The method of claim 1, further including the act of providing, by said at least one backup member, fail-over support for a primary member.

3. The method of claim 2, further including the act of periodically checking, by said at least one backup member, an availability of said primary member.

4. The method of claim 3, further including the act of assuming the primary member role, by a predetermined one of said at least one backup member, web farm member, of said web farm if said primary member is not available.

5. The method of claim 4, wherein said at least one backup members assume a role of said primary member in a predetermined order.

6. The method of claim 3, wherein said at least one backup member checks the availability of said primary member a predetermined number of times before assuming a role of said primary member.

7. A web farm comprising:
a network;
a primary member, coupled to said network and configured to receive data from an distribution server;
at least one backup member, each backup member coupled to said network and configured to receive data from said distribution server; and
wherein said primary member is further configured to:
determine whether a new data is available for said web farm at said distribution server;
place the web farm in a prepare state if the new data is available, wherein when said web farm is in said prepare state, said primary member causes the primary member and each backup member to:
retrieve the new data from the distribution server and store said retrieved new data in a temporary storage;
upon successfully storing said retrieved new data in said temporary storage, sending a notification to said primary member;
if said primary member received notifications from said primary member and each of said backup members within a predetermined time since the start of said prepare state, placing the web farm in a commit state; and
if said primary member has not received notifications from said primary member and each of said backup members within said predetermined time since the start of said prepare state, placing the web farm in an abort state.

8. The web farm of claim 7, wherein said primary member is further configured to repeatedly determine, on a periodic basis, whether new data is available to the web farm.

9. The web farm of claim 7, wherein said primary member and each backup member is further configured to implement a rollback action when said web farm is in said abort state.

10. The web farm of claim 7, wherein a predetermined one of said backup members is further configured to provide fail-over support for said primary member.

11. The web farm of claim 10, wherein said predetermined backup member is further configured to periodically check the availability of said primary member.

12. The web farm of claim 11, wherein said predetermined backup member is further configured to assuming a role of said primary member if said primary member is not available.

13. The web farm of claim 12, wherein said predetermined backup member is farther configured to check the availability of said primary member a predetermined number of times before assuming control.

14. The web farm of claim 12, wherein said backup members are further configured to assume a role of said primary member in a predetermined order.

15. A system comprising:
a network means;
a primary member means, coupled to said network means and configured to receive data from a distribution server means;
at least one backup member means, each backup member means coupled to said network means and configured to receive data from said distribution server means;
wherein said primary member means comprises:
a new data determination means for determining whether a new data is available at said distribution server means;
a prepare state means for placing the system in a prepare state if said data determination means determines that said new data is available, wherein when said system is in said prepare state, said prepare state means causes the primary member means and each backup member means to:
retrieve the new data from the distribution server means and store said retrieved new data in a temporary storage means;
upon successfully storing said retrieved new data in said temporary storage, sending a notification to said primary member means;
a commit state means for placing the system in a commit state if said primary member means received notifications from said primary member means and each backup member means within a predetermined time since the start of said prepare state; and
an abort means for placing the system in an abort state if said primary member means does not receive notifications from said primary member means and each backup member means within said predetermined time since the start of said prepare state.

16. The system of claim 15, wherein said new data determination means repeatedly and periodically determines whether new data is available.

17. The system of claim 15, further comprising a rollback means for rolling back said new data when said system is in said abort state.

18. The system of claim 15, further including means for providing, by a predetermined one of said backup member means a fail-over support for a primary member.

19. The system of claim 18, wherein said predetermined one of said backup member means periodically checks an availability of said primary member.

20. The system of claim 19, wherein said predetermined one of said backup member means assumes a role of said primary member means if said primary member means is not available.

21. The system of claim 20, wherein said predetermined one of said backup member means assumes said role of said primary member means only after said primary member means has been not available a predetermined number of times.

22. The system of claim 20, wherein said backup member means are configured to assume a role of said primary member means in a predetermined order.

23. A machine readable medium tangibly storing a sequence of instructions executable by a machine to perform a method for synchronizing data in a web farm comprising a primary member, at least one backup member, and a distribution server, said method comprising:
determining, at the primary member, whether a new data is available to the web farm at said distribution server;
if the new data is available, at said primary member, placing the web farm in a prepare state, wherein when said web farm is in said prepared state said primary member causes the primary member and each backup member to:
retrieve the new data from the distribution server and store said retrieved new data in a temporary storage;
upon successfully storing said retrieved new data in said temporary storage, notify said primary member;
at the primary member, if notified by said primary member and each backup member within a predetermined time since the staff of said prepare state, placing the web farm in a commit state, wherein when said web farm is in said commit state, said primary member causes the primary member and each backup member to commit said retrieved new data; and
at the primary member, if not notified by one or more of said primary member and each said backup member within said predetermined time from the start of said prepare state, placing the web farm in an abort state, wherein when said web farm is in said abort state, said primary member causes the primary member and each backup member to roll back said new data.

24. The machine readable medium of claim 23, further including the act of providing, by a predetermined one of said backup members fail-over support for a primary member.

25. The machine readable medium of claim 24, further including the act of periodically checking, by said predetermined one of said backup members, an availability of said primary member.

26. The machine readable medium of claim 25, further including the act of assuming a role of said primary member, control, by said predetermined one of said backup members, said primary member is not available.

27. The machine readable medium of claim 25, wherein said predetermined one of said backup members checks the availability of said primary member a predetermined number of times before assuming the role of the primary member.

28. The machine readable medium of claim 27, wherein said backup members assume the role of the primary member in a predetermined order.

* * * * *

UNITED STATES PATENT AND TRADEMARK OFFICE
CERTIFICATE OF CORRECTION

PATENT NO.        : 7,127,512 B2
APPLICATION NO. : 10/079772
DATED             : October 24, 2006
INVENTOR(S)       : Brian Minear and Phil Nguyen It is certified that error appears in the above-identified patent and that said Letters Patent is hereby corrected as shown below:

Title page Should read

(75) Inventors: Phil Nguyen, San Diego, CA (US); Brian Minear, San Diego, CA (US)

(73) Assignee: QUALCOMM Incorporated

Signed and Sealed this

Fifth Day of February, 2008

JON W. DUDAS
*Director of the United States Patent and Trademark Office*